(12) United States Patent
Davies et al.

(10) Patent No.: US 8,146,230 B2
(45) Date of Patent: Apr. 3, 2012

(54) METHOD OF REDUCING PRESSUING DURING INSTALLATION OF A FASTENER

(75) Inventors: John A. Davies, Renton, WA (US); Jeffrey A. Wilkerson, Bothell, WA (US); John R. Porter, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 550 days.

(21) Appl. No.: 12/364,366

(22) Filed: Feb. 2, 2009

(65) Prior Publication Data

US 2010/0196120 A1 Aug. 5, 2010

(51) Int. Cl.
*B21D 39/00* (2006.01)
*B23P 11/00* (2006.01)

(52) U.S. Cl. .......... 29/458; 29/525.01; 29/525.02; 29/525.13; 411/82; 411/82.1; 411/258; 411/930

(58) Field of Classification Search ............ 29/458, 29/525.01, 525.02, 525.11, 525.13, 527.2; 411/82, 82.1, 258, 930, 399
See application file for complete search history.

(56) References Cited

U.S. PATENT DOCUMENTS

| | | | | |
|---|---|---|---|---|
| 388,000 A | * | 8/1888 | Rider | 411/399 |
| 465,101 A | * | 12/1891 | Richards | 411/399 |
| 933,865 A | * | 9/1909 | Umholtz | 411/403 |
| 1,238,636 A | * | 8/1917 | Christofferson | 411/399 |
| 3,139,786 A | | 7/1964 | Ardell | |
| 3,464,306 A | | 9/1969 | Reynolds et al. | |
| 3,711,347 A | * | 1/1973 | Wagner et al. | 156/91 |
| 3,828,422 A | * | 8/1974 | Schmitt | 29/525 |
| 5,175,665 A | | 12/1992 | Pegg | |
| RE36,741 E | | 6/2000 | Walther et al. | |
| 6,334,748 B1 | | 1/2002 | Gudjonsson | |
| 7,597,518 B1 | | 10/2009 | Curtis | |

FOREIGN PATENT DOCUMENTS

| | | |
|---|---|---|
| GB | 13368 | 0/1912 |
| GB | 152885 | 10/1920 |
| GB | 913759 | 9/1969 |
| GB | 2227540 | 1/1990 |

OTHER PUBLICATIONS

Huck Fasteners an Alcoa Business, LGP Engineering Standard found at 3 pages, Jan. 24, 1991.
European Patent Office (International Searching Authority), International Search Report & Written Opinion for PCT/US2010/022846 mailed Apr. 8, 2010.

* cited by examiner

*Primary Examiner* — Jermie Cozart
(74) *Attorney, Agent, or Firm* — Klintworth & Rozenblat IP LLC

(57) ABSTRACT

A fastener may include a shaft and a head. The shaft may have first and second opposing ends and a first surface having a first diameter. The head may be attached to the first opposing end of the shaft. The head may have a second surface comprising a second diameter which is larger than the first diameter. The head may have a third surface extending between the second surface and the first surface. The third surface may be defined by a relief slot extending from the second surface to at least one of near and to the first surface. The relief slot may be for providing a relief path to reduce pressure during installation, using a viscous compound, of the fastener to a member.

20 Claims, 12 Drawing Sheets

US 8,146,230 B2

METHOD OF REDUCING PRESSUING DURING INSTALLATION OF A FASTENER

BACKGROUND OF THE DISCLOSURE

It is often necessary to install fasteners into a member, such as composite material. Viscous compounds are frequently used between fasteners and the member during installation. However, the installation forces on the viscous material between the fastener and member may result in hydraulic pressures during the wet-installation process which may generate localized irregularities in the member. The viscous material may also reduce the coefficient of friction between the fastener and the member increasing the stress on the fastener anti-rotation member during tightening, which may lead to damaged of the fastener or installation keys and/or tooling, may increase installation cost due to the requirement of special installation tooling and/or increased maintenance of the fasteners, member, and/or tooling, and/or may lead to other types of problems.

A fastener and method of installation is needed to decrease one or more problems of one or more of the conventional fasteners and methods of installation.

SUMMARY OF THE DISCLOSURE

In one aspect of the disclosure, a fastener may include a shaft and a head. The shaft may have first and second opposing ends and a first surface having a first diameter. The head may be attached to the first opposing end of the shaft. The head may have a second surface comprising a second diameter which is larger than the first diameter. The head may have a third surface extending between the second surface and the first surface. The third surface may be defined by a relief slot extending from the second surface to at least one of near and to the first surface. The relief slot may be for providing a relief path to reduce pressure during installation, using a viscous compound, of the fastener to a member.

In another aspect of the disclosure, an apparatus may include a member, a fastener, and a viscous compound. The member may comprise a surface defined by a hole. The fastener may include a shaft and a head. The shaft may include first and second opposing ends and a first surface having a first diameter. The head may be attached to the first opposing end of the shaft. The head may have a second surface comprising a second diameter which is larger than the first diameter. The head may have a third surface extending between the second surface and the first surface. The third surface may be defined by a relief slot extending from the second surface to at least one of near and to the first surface. The shaft may be disposed within the hole and the second surface may be disposed at least one of against the member surface, near the member surface, and within the hole. A viscous compound may be disposed at least one of at, near, and in the hole between the member and the fastener. The viscous compound may be disposed in the relief slot extending from at least one of near and to the first surface, to the second surface, and at least one of beyond the second surface and out of the hole.

In still another aspect of the disclosure, a method may be disclosed of reducing pressure during installation of a fastener to a member using a viscous compound. In one step, a fastener may be provided comprising: a shaft and a head. The shaft may have first and second opposing ends and a first surface having a first diameter. The head may be attached to the first opposing end of the shaft. The head may have a second surface comprising a second diameter which is larger than the first diameter. The head may have a third surface extending between the second surface and the first surface. The third surface may be defined by a relief slot extending from the second surface to at least one of near and to the first surface. In another step, a member may be provided comprising a surface defined by a hole. In an additional step, the shaft may be disposed within the hole of the member so that the second surface is disposed at least one of against the member surface, near the member surface, and within the hole. In yet another step, a viscous compound may be disposed at least one of at, near, and in the hole between the member and the fastener. In an additional step, the shaft may be secured tightly within the hole. In another step, pressure may be reduced within the hole by the viscous compound flowing within the relief slot from at least one of near and at the first surface, to the second surface, and at least one of beyond the second surface and out of the hole.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
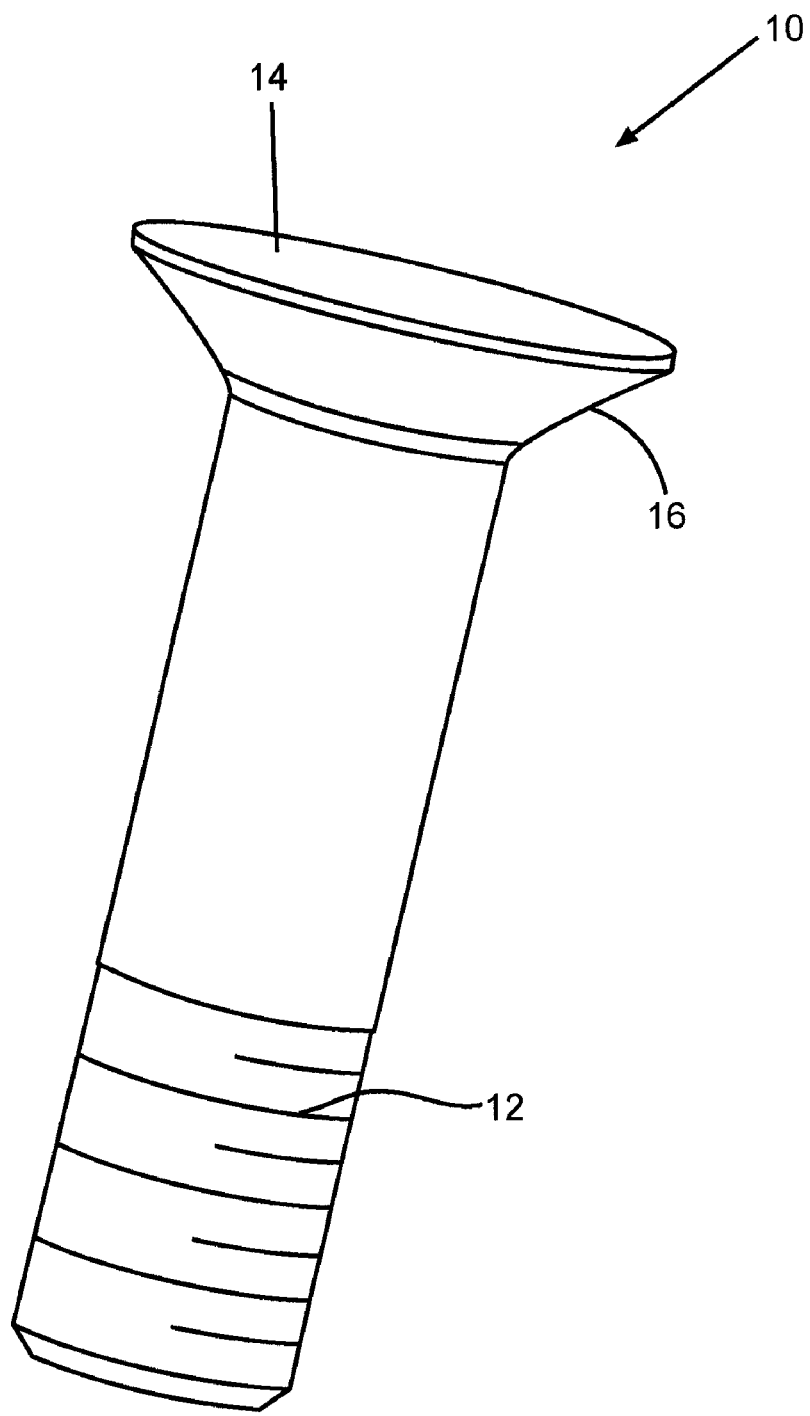
FIG. 1 is a perspective view of a typical conventional fastener comprising a shaft and a head.

FIG. 1 is a perspective view of a typical conventional fastener 10 comprising a threaded shaft 12 and a head 14. The head 14 may have a countersunk surface 16 extending non-parallel to the threaded shaft 12. The countersunk surface 16 may have a substantially conical shape without the presence of a slot in the countersunk surface 16. In other embodiments, the shaft 12 may not be threaded.

Figure 2:
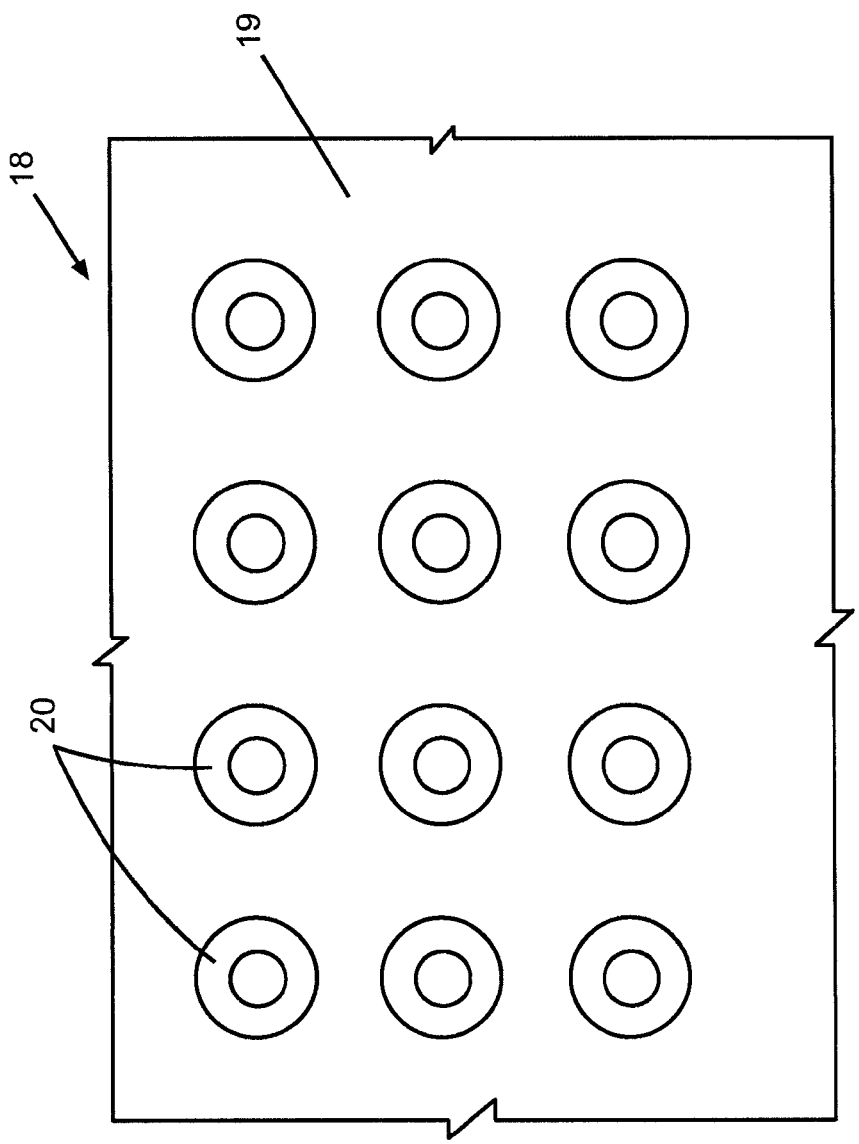
FIG. 2 is a top view of a typical conventional member having a surface defined by a plurality of holes.

FIG. 2 is a top view of a typical conventional member 18 having a surface 19 defined by a plurality of holes 20. The member 18 may comprise a composite material.

Figure 3:
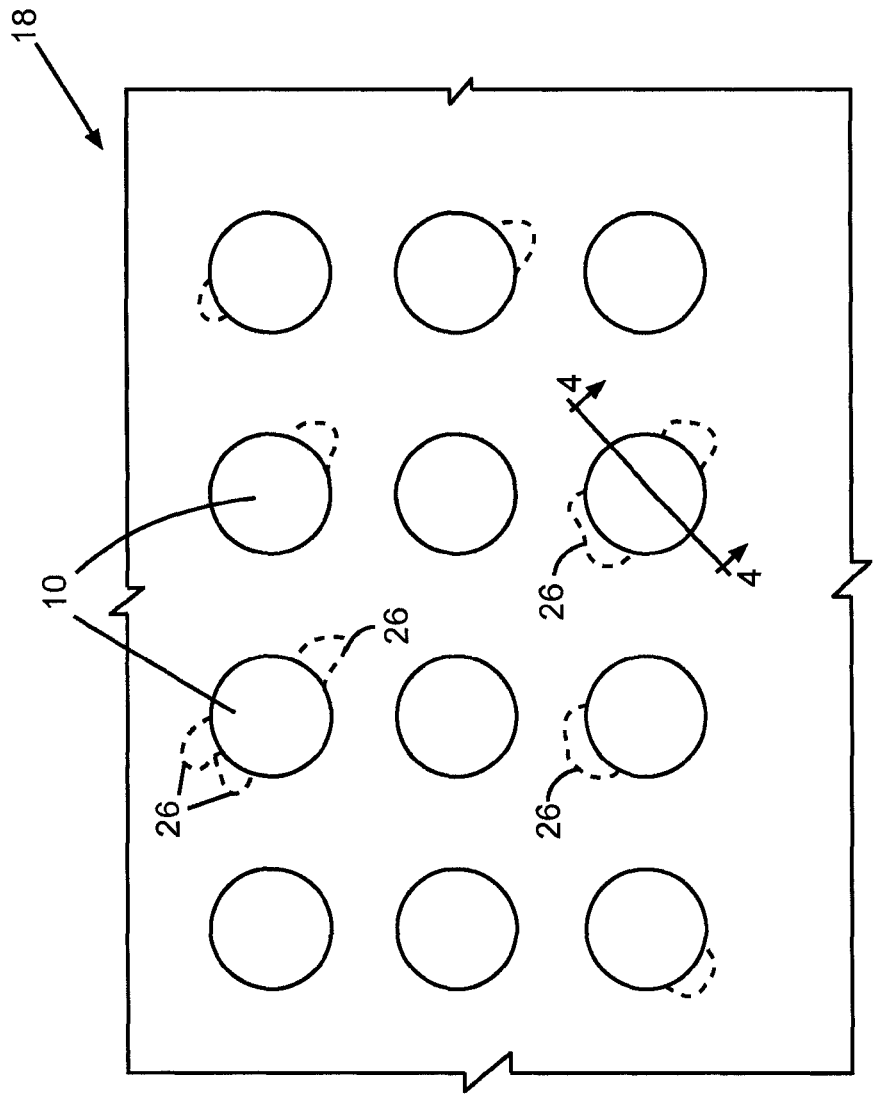
FIG. 3 is a top view of the typical conventional member of FIG. 2 with a plurality of the conventional fastener of FIG. 1 having been wet-installed into the holes of the conventional member.

FIG. 3 is a top view of the typical conventional member 18 of FIG. 2 with a plurality of the conventional fastener 10 of FIG. 1 having been wet-installed into the holes 20 (as shown in FIG. 2) of the conventional member 18.

Figure 4:
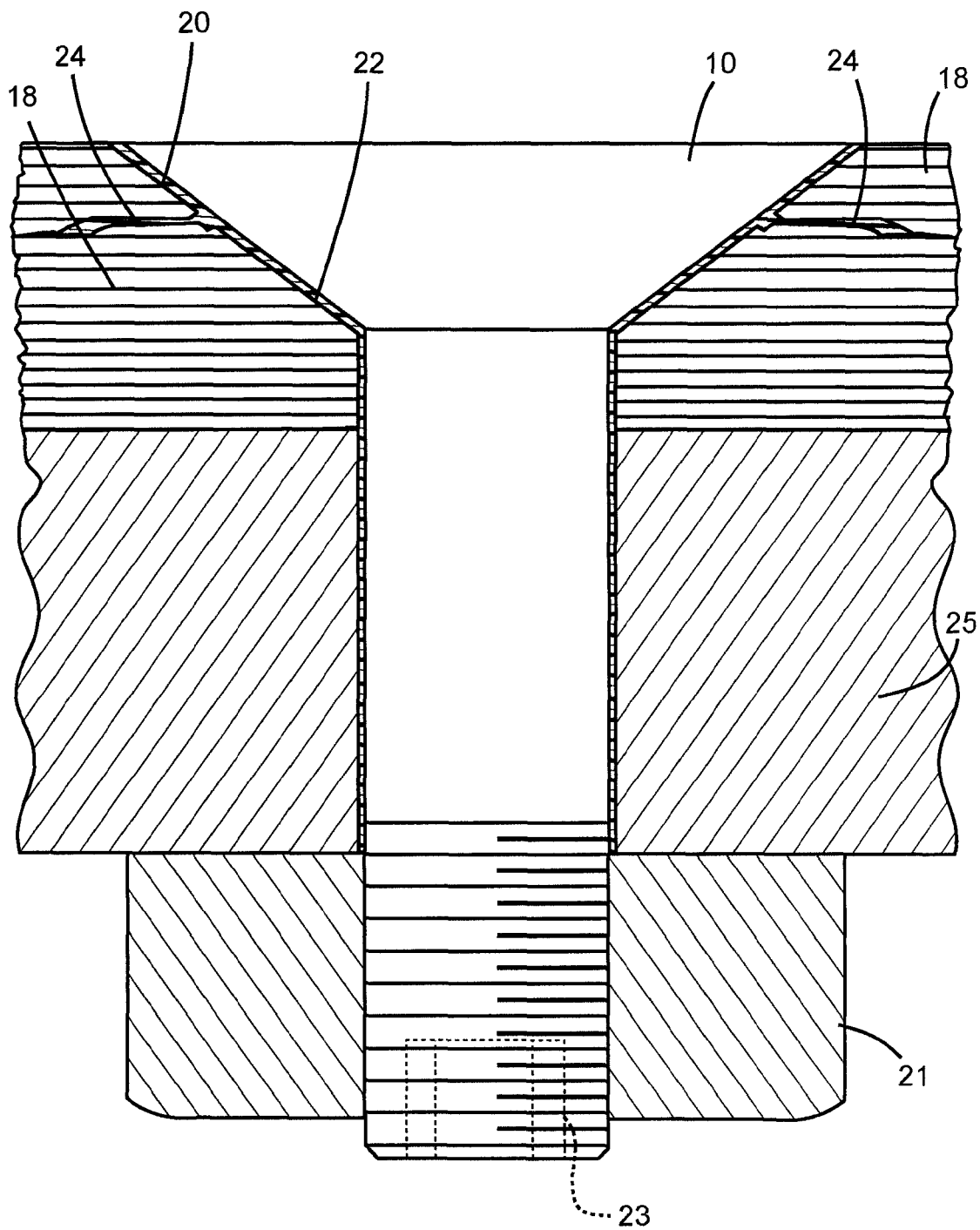
FIG. 4 is a partial cross-section view through line 4-4 of the typical conventional member of FIG. 3 showing a cross-sectional view of one of the conventional fasteners installed within one of the holes.

FIG. 4 is a partial cross-section view through line 4-4 of the typical conventional member 18 of FIG. 3 showing a cross-sectional view of one of the conventional fasteners 10 installed within one of the holes 20. A nut 21 may be rotated onto the fastener 10 to secure the fastener 10 between member 18 and member 25 using a tool (not shown) engaged with an anti-rotation member 23. Members 18 and 25 may comprise composite materials. In other embodiments, nut 21 as well as members 18 and 25 may vary. Any type of installation tool may be used to install the nut 21 onto the fastener 10, including a key, a socket, a wrench, and/or another type of installation tool which may engage anti-rotation member 23. In other embodiments an anti-rotation member 23 may not be present and/or alternate methods of securing the fastener may be employed. A viscous compound 22 may be disposed between the fastener 10 and the member 18. The viscous compound 22 may have been used within the holes 20 of the member 18 to prevent corrosion, and/or may have been used for other reasons. The viscous compound 22 may comprise a fluid and/or comprise varying substances. Due to pressure buildup of the viscous compound 22 within the holes 20 during the installation process, irregularities 24 may have been formed in the conventional member 18. As seen in FIG. 3, a plurality of irregularities 26 may also have been formed in the conventional member 18 during the installation process as a result of hydraulic pressure. Moreover, due to the viscous compound reducing the friction between fastener 10 and member 18, the anti-rotation member 23 and/or tool (not shown) may break, may be stripped, and/or may otherwise be damaged during the installation process.

Figure 5:
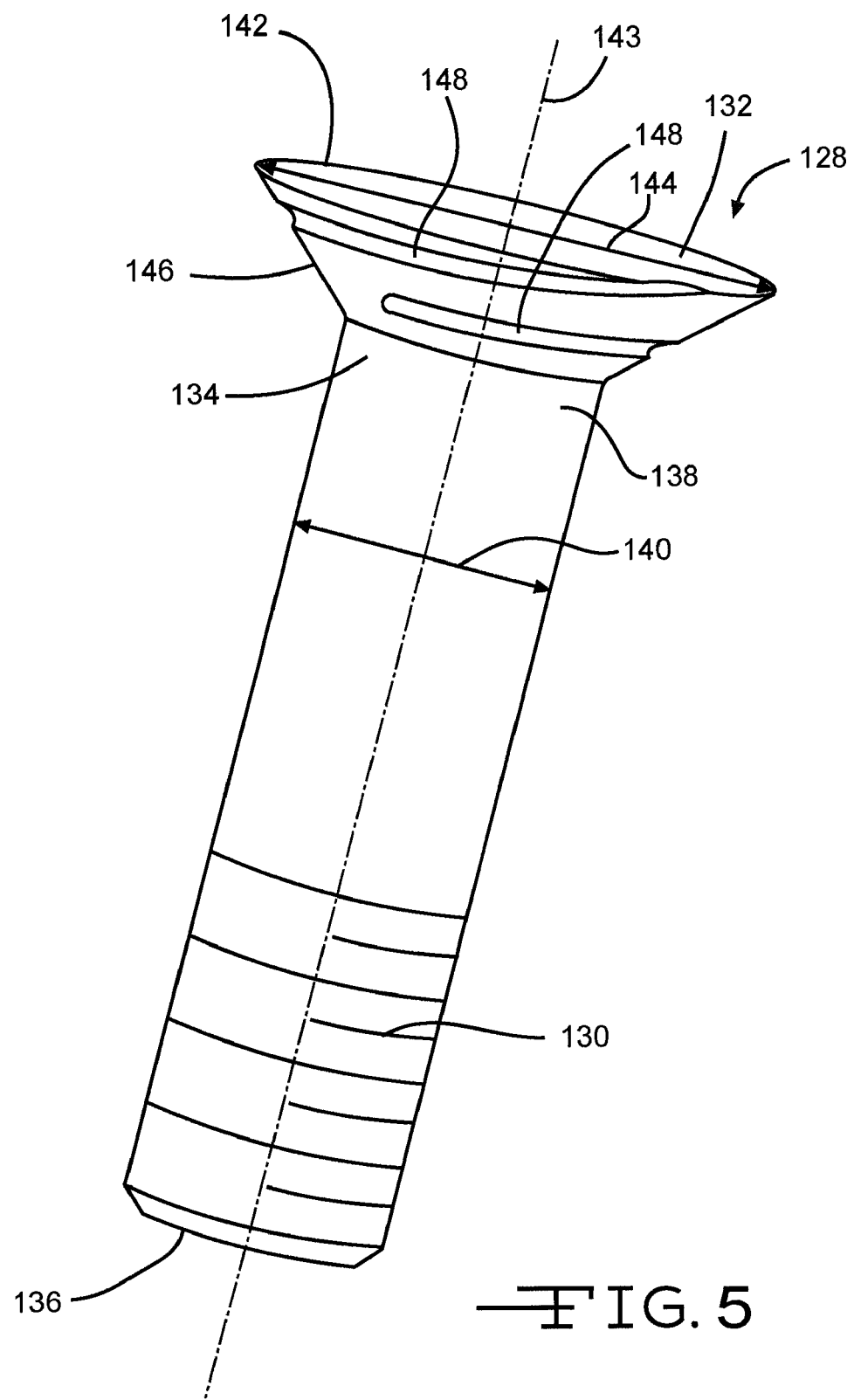
FIG. 5 is a perspective view of one embodiment of a fastener under the disclosure.

FIG. 5 is a perspective view of one embodiment of a fastener 128 under the disclosure. The fastener 128 may comprise a countersunk fastener. In other embodiments, the fastener 128 may vary to include any type of fastener, threaded or non-threaded, one-part or multiple part fasteners, and/or still other types of fasteners. The fastener 128 may comprise a threaded shaft 130 and a head 132. In other embodiments, the shaft 130 may not be threaded. The threaded shaft 130 may have first and second opposing ends 134 and 136. The threaded shaft 130 may have a first surface 138 having a first diameter 140. The head 132 may be attached to the first opposing end 134 of the threaded shaft 130. The head 132 may have a second surface 142, which may comprise a top surface of the head 132, comprising a second diameter 144 which may be larger than the first diameter 140. The second surface 142 may be substantially perpendicular to an imaginary plane 143 extending axially along the threaded shaft 130. In other embodiments, the second surface 142 may vary.

The head 132 may have a third surface 146, which may comprise a side surface of the head 132, extending between the second surface 142 and the first surface 138. The third surface 146 may be conically-shaped and non-parallel to both the second surface 142 and the first surface 138. In other embodiments, the third surface 146 may vary. The third surface 146 may be defined by a relief slot 148 extending from the second surface 142 to at least one of near and to the first surface 138. The relief slot 148 may comprise a helical shape extending around the third surface 146. In other embodiments, the relief slot 148 may vary. The relief slot 148 may provide a relief path to reduce pressure during wet installation of the fastener 128, using a viscous compound (not shown), to a member which may comprise a composite material (not shown).

Figure 6:
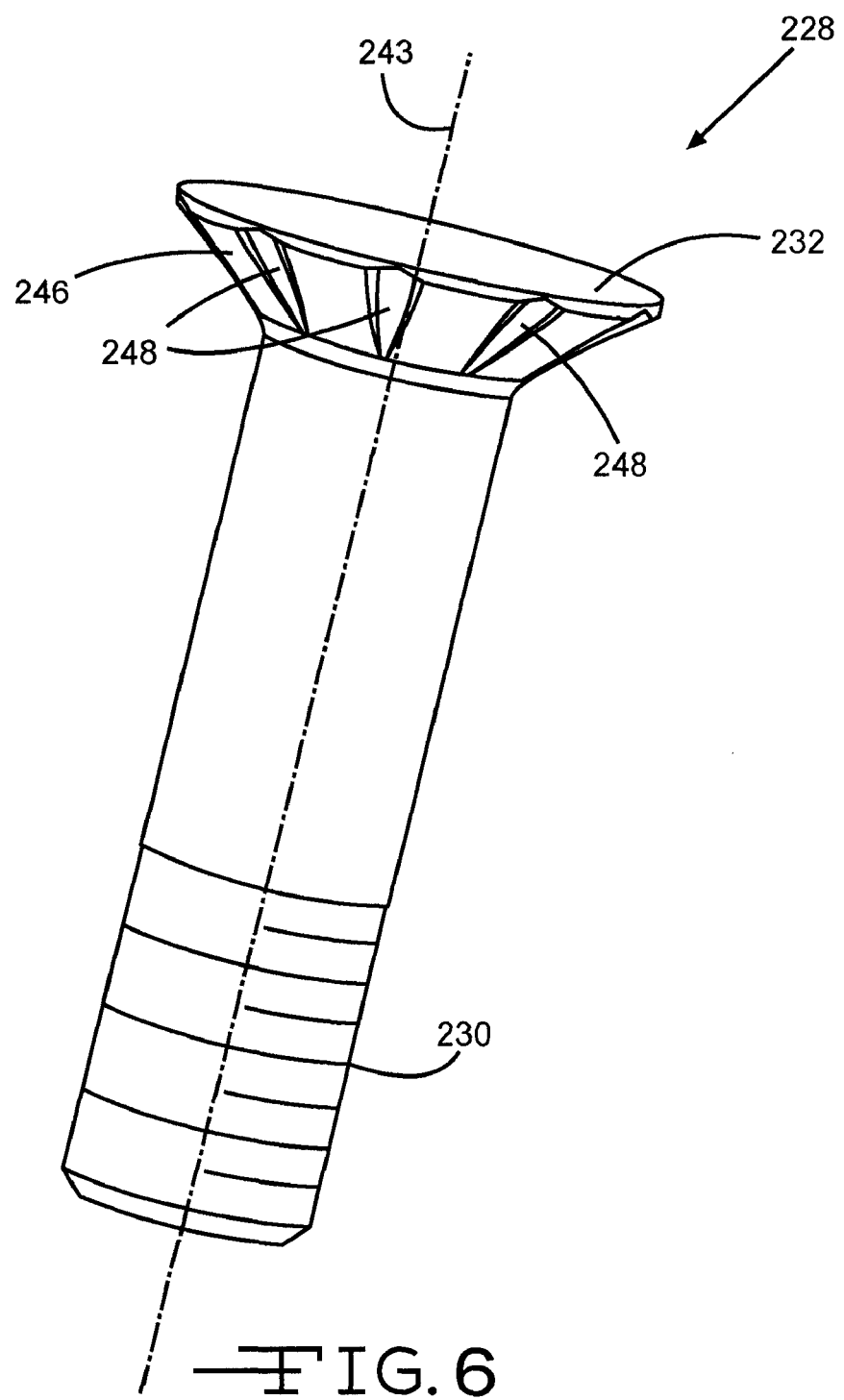
FIG. 6 is a perspective view of another embodiment of a fastener under the disclosure.

FIG. 6 is a perspective view of another embodiment of a fastener 228 under the disclosure. The fastener 228 may comprise a threaded shaft 230 and a head 232. In other embodiments, the shaft 230 may not be threaded. The fastener 228 may be substantially identical to the fastener of FIG. 5 except the relief slot 248 may comprise a plurality of slots in the third surface 246 extending substantially parallel to an imaginary plane 243 extending axially through the threaded shaft 230.

Figure 7:
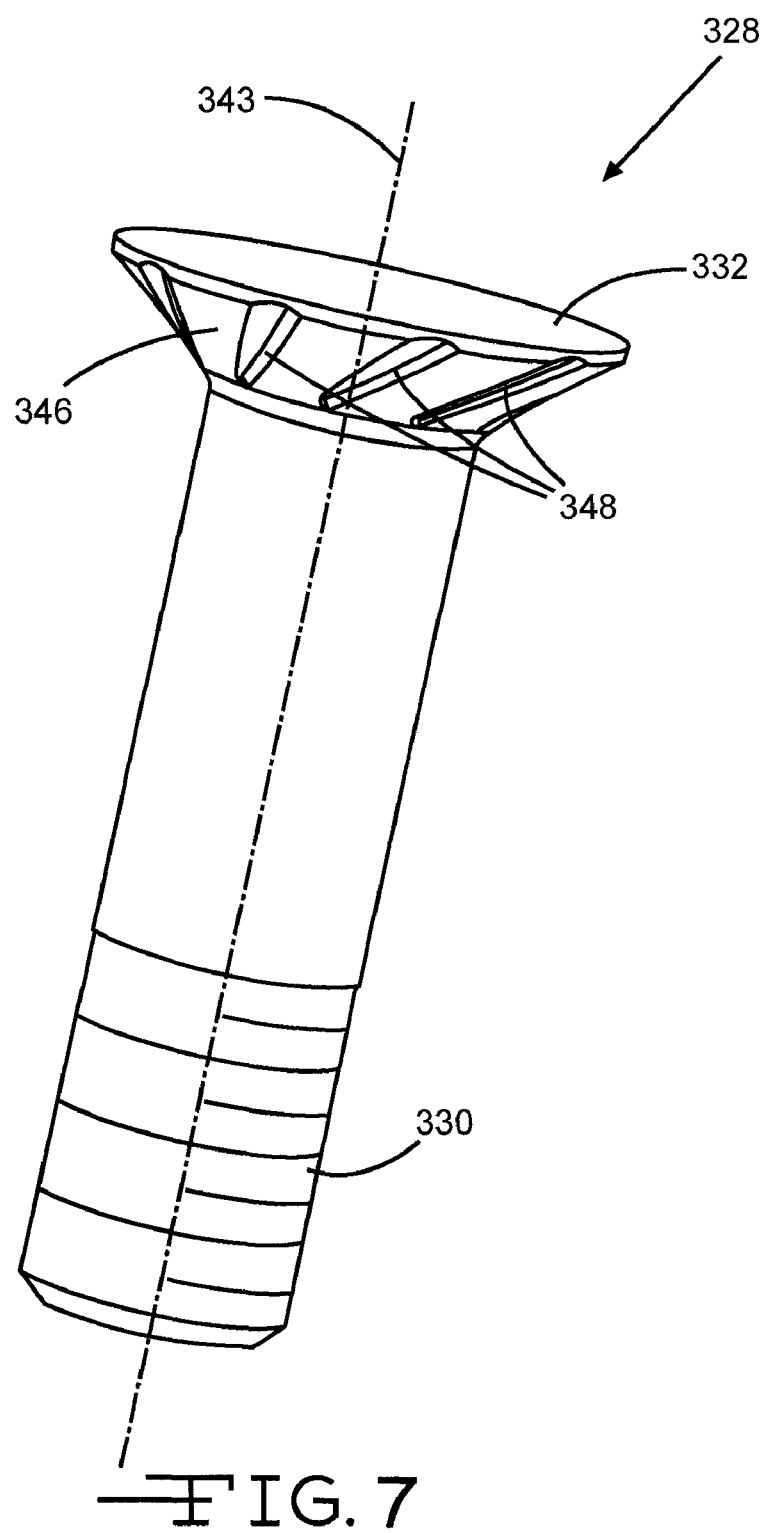
FIG. 7 is a perspective view of yet another embodiment of a fastener under the disclosure.

FIG. 7 is a perspective view of yet another embodiment of a fastener 328 under the disclosure. The fastener 328 may comprise a threaded shaft 330 and a head 332. In other embodiments, the shaft 330 may not be threaded. The fastener 328 may be substantially identical to the fastener of FIG. 5 except the relief slot 348 may comprise a plurality of slots in the third surface 346 extending non-parallel to an imaginary plane 343 extending axially through the threaded shaft 330.

Figure 8:
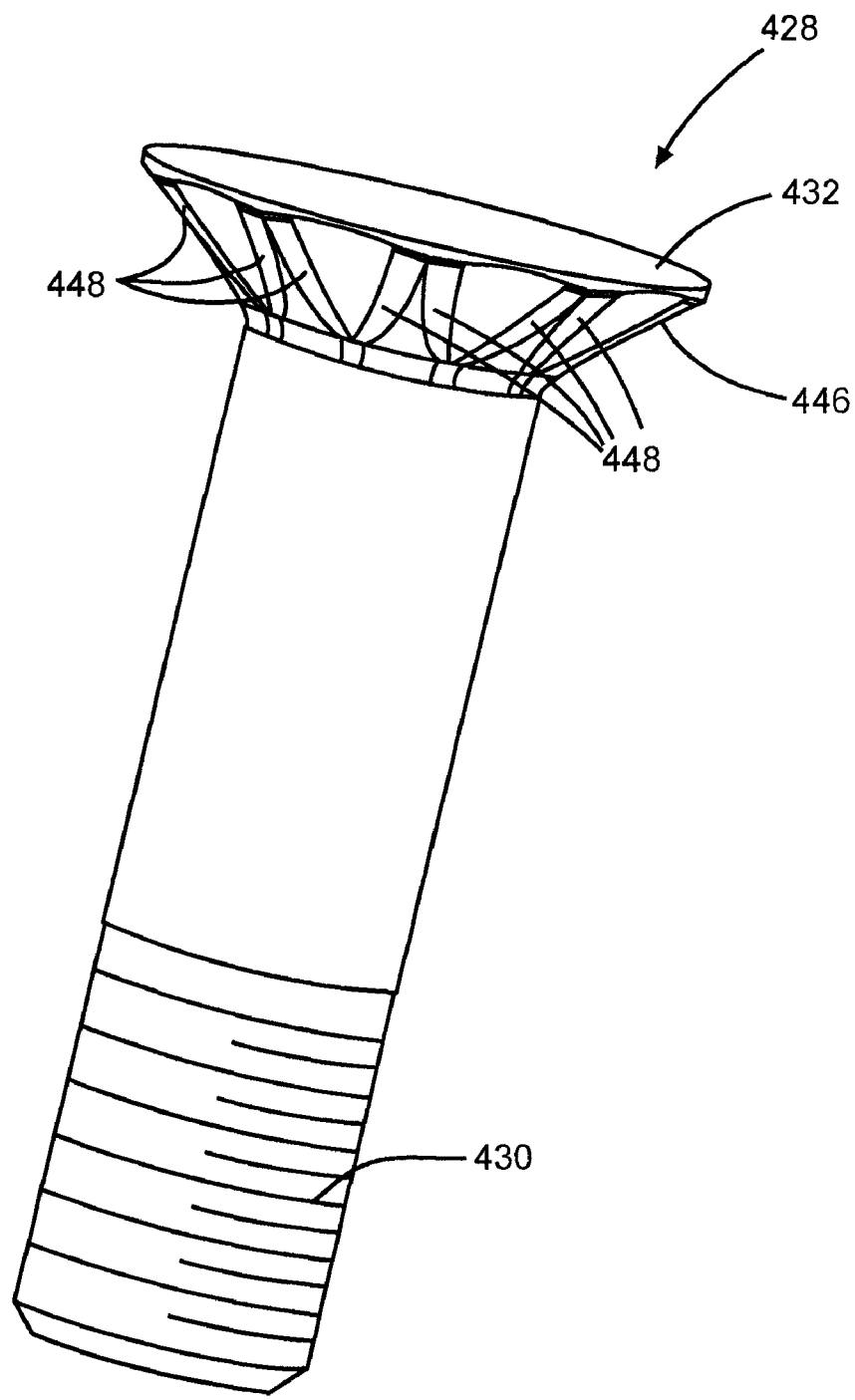
FIG. 8 is a perspective view of still another embodiment of a fastener under the disclosure.

FIG. 8 is a perspective view of still another embodiment of a fastener 428 under the disclosure. The fastener 428 may comprise a threaded shaft 430 and a head 432. In other embodiments, the shaft 430 may not be threaded. The fastener 428 may be substantially identical to the fastener of FIG. 5 except the relief slot 448 may comprise at least one of an oscillating arc and a sine wave shape extending around the third surface 446.

Figure 9:
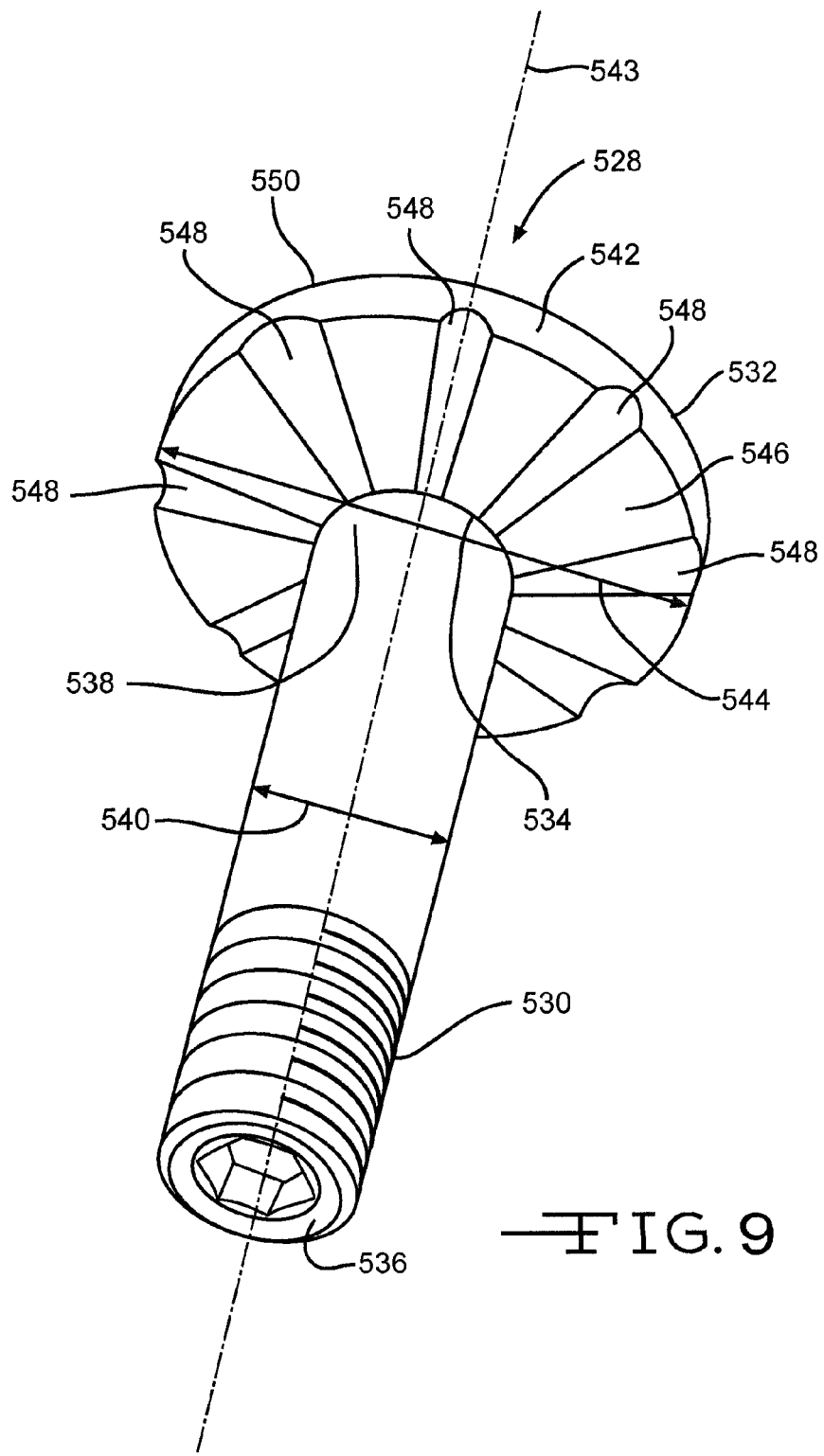
FIG. 9 is a perspective view of an additional embodiment of a fastener under the disclosure.

FIG. 9 is a perspective view of an additional embodiment of a fastener 528 under the disclosure. The fastener 528 may comprise a threaded shaft 530 and a head 532. In other embodiments, the shaft 530 may not be threaded. The fastener 528 may comprise a protruding head fastener. In other embodiments, the fastener 528 may vary. The threaded shaft 530 may have first and second opposing ends 534 and 536. The threaded shaft 530 may have a first surface 538 having a first diameter 540. The head 532 may be attached to the first opposing end 534 of the threaded shaft 530. The head 532 may have a second surface 542, which may comprise a side-surface of the head 532, comprising a second diameter 544 which is larger than the first diameter 540. In other embodiments, the second surface 542 may vary. The head 532 may have a third surface 546, which may comprise a bottom surface, extending between the second surface 542 and the first surface 538. The third surface 546 may be substantially perpendicular to the second surface 542. In other embodiments, the third surface 546 may vary. The head 532 may further comprise a fourth surface 550, which may comprise a top surface, which may be substantially perpendicular to the second surface 542. In other embodiments, the fourth surface 550 may vary.

The third surface 546 may be defined by a relief slot 548 extending from the second surface 542 to at least one of near and to the first surface 538. The relief slot 548 may comprise a plurality of slots in the third surface 546 extending substantially parallel to an imaginary plane 543 extending axially through the threaded shaft 530. The relief slot 548 may provide a relief path to reduce pressure during wet installation of the fastener 528, using a viscous compound (not shown), to a member which may comprise a composite material (not shown). In other embodiments, the relief slot 548 may comprise any of the shapes of FIGS. 5, 7, and 8. In still other embodiments, the relief slot 548 may vary.

Figure 10:
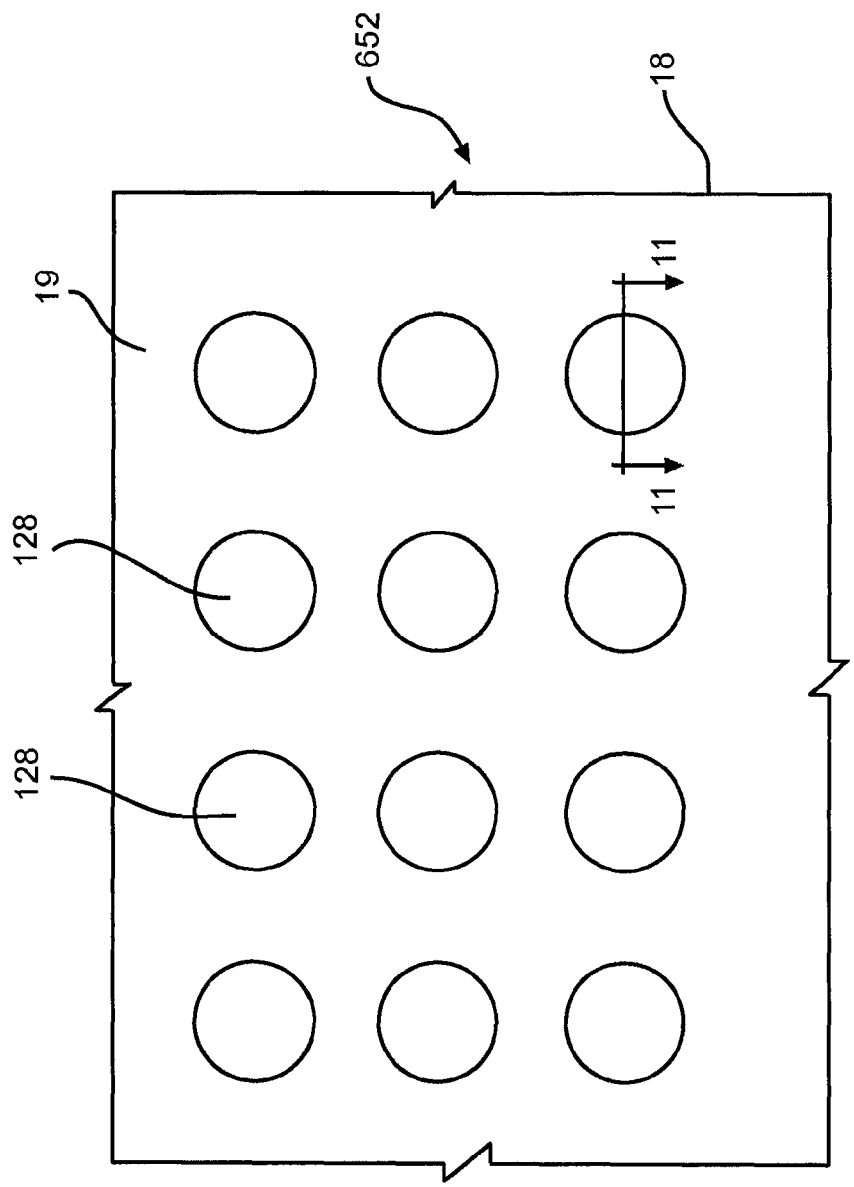
FIG. 10 is a top view of an apparatus comprising a plurality of the fastener of the embodiment of FIG. 5 wet-installed into the holes defined in the surface of the typical conventional member of FIG. 2.

FIG. 10 is a top view of an apparatus 652 comprising a plurality of the fastener 128 of the embodiment of FIG. 5 having been wet-installed into the holes 20 (as shown in FIG. 2) defined in the surface 19 of the typical conventional member 18 of FIG. 2. The member 18 may comprise a composite material.

Figure 11:
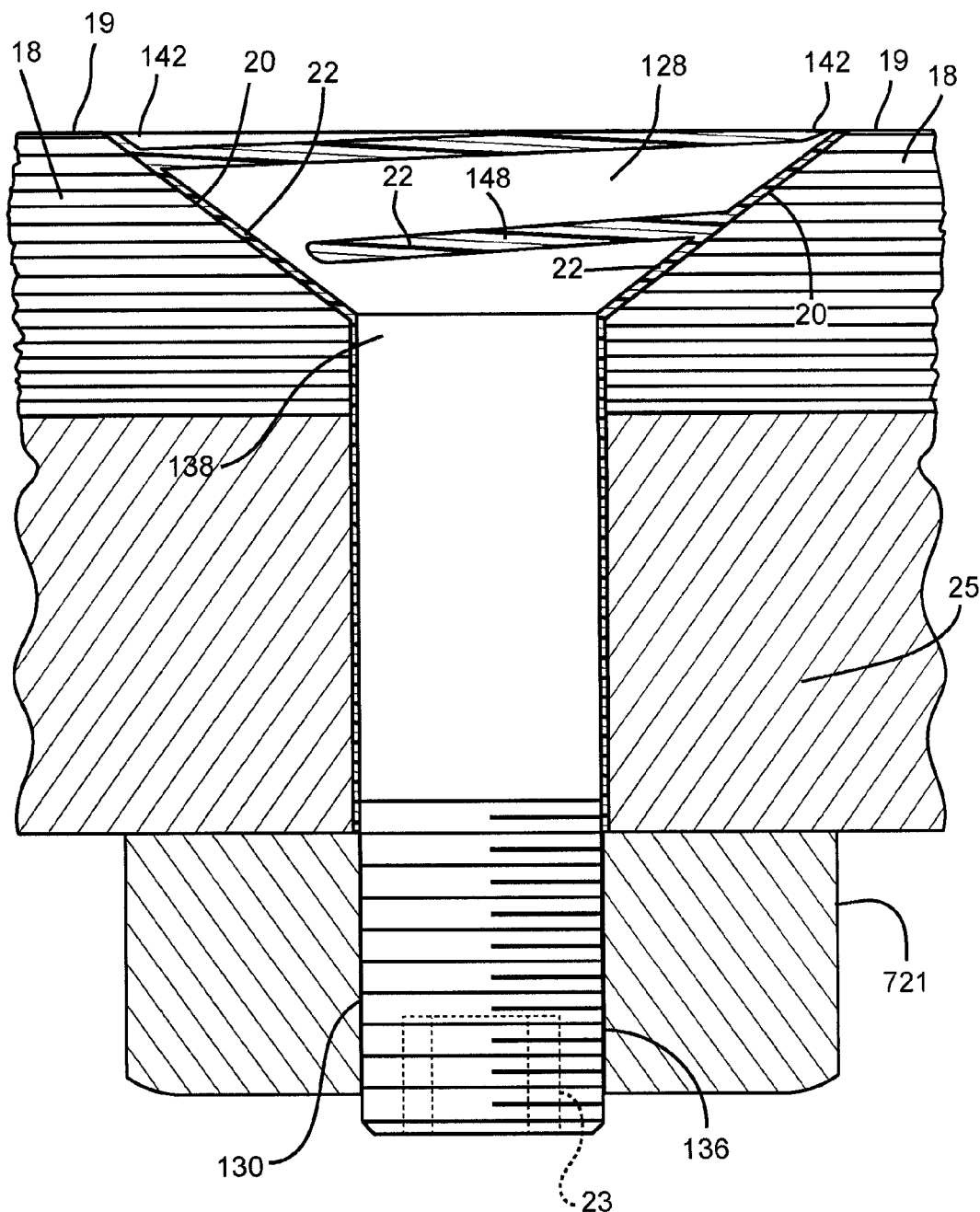
FIG. 11 is a partial cross-section view through line 11-11 of the apparatus of FIG. 10 showing a cross-sectional view of one of the fasteners installed within one of the holes of the member.

FIG. 11 is a partial cross-section view through line 11-11 of the apparatus 652 of FIG. 10 showing a cross-sectional view of one of the fasteners 128 installed within one of the holes 20 of the member 18. A nut 721 may be rotated onto the second opposing end 136 of the threaded shaft 130 securing the fastener 128 between member 18 and member 25 using a tool (not shown) engaged with the anti-rotation member 23. Members 18 and 25 may comprise composite materials. In other embodiments, members 18 and 25 may vary. In still other embodiments nut 721, threaded shaft 130, and/or anti-rotation member 23 may vary. Any type of tooling may be used during installation of the nut 721 onto the fastener 128, including the use of a key, a socket, a wrench, and/or another type of installation tool. In other embodiments an anti-rotation member 23 may not be present and/or alternate methods of securing the fastener may be employed. The second surface 142 may be disposed at least one of against the member surface 19, near the member surface 19, and within the hole 20. A viscous compound 22 may be disposed at least one of at, near, and in the hole 20 between the fastener 128 and the member 18. The viscous compound 22 may comprise at least one of sealant, paint, primer, adhesive, resin, grease, corrosion inhibiting compounds, or other materials. The viscous compound 22 may be disposed in the relief slot 148 extending from at least one of near and to the first surface 138, to the second surface 142, and at least one of beyond the second surface 142 and out of the hole 20.

The relief slot 148 may have been used to allow excess fluid movement of the viscous compound 22 from the holes 20 of the member 18 during installation of the fasteners 128 into the holes 20 in order to reduce and/or eliminate hydraulic pressure during fastener installation. As shown in FIG. 11, as a result of using the relief slot 148 during installation of the fasteners 128 into the holes 20 to allow fluid movement of the viscous compound 22 from the holes 20, no irregularities have formed in the member 18. Further, neither the anti-rotation member 23, nor the tool (not shown) to install it, has been broken, has been stripped, or has been damaged as a result of the installation process. Moreover, as seen in FIG. 10, no irregularities have formed in the member 18.

In other embodiments, the apparatus 652 may utilize any of the fasteners 228, 328, 428, and 528 and incorporated relief slots 248, 348, 448, and 548 disclosed herein, and/or other types of fasteners utilizing varying relief slots, in order to reduce and/or eliminate hydraulic pressure during fastener installation.

Figure 12:
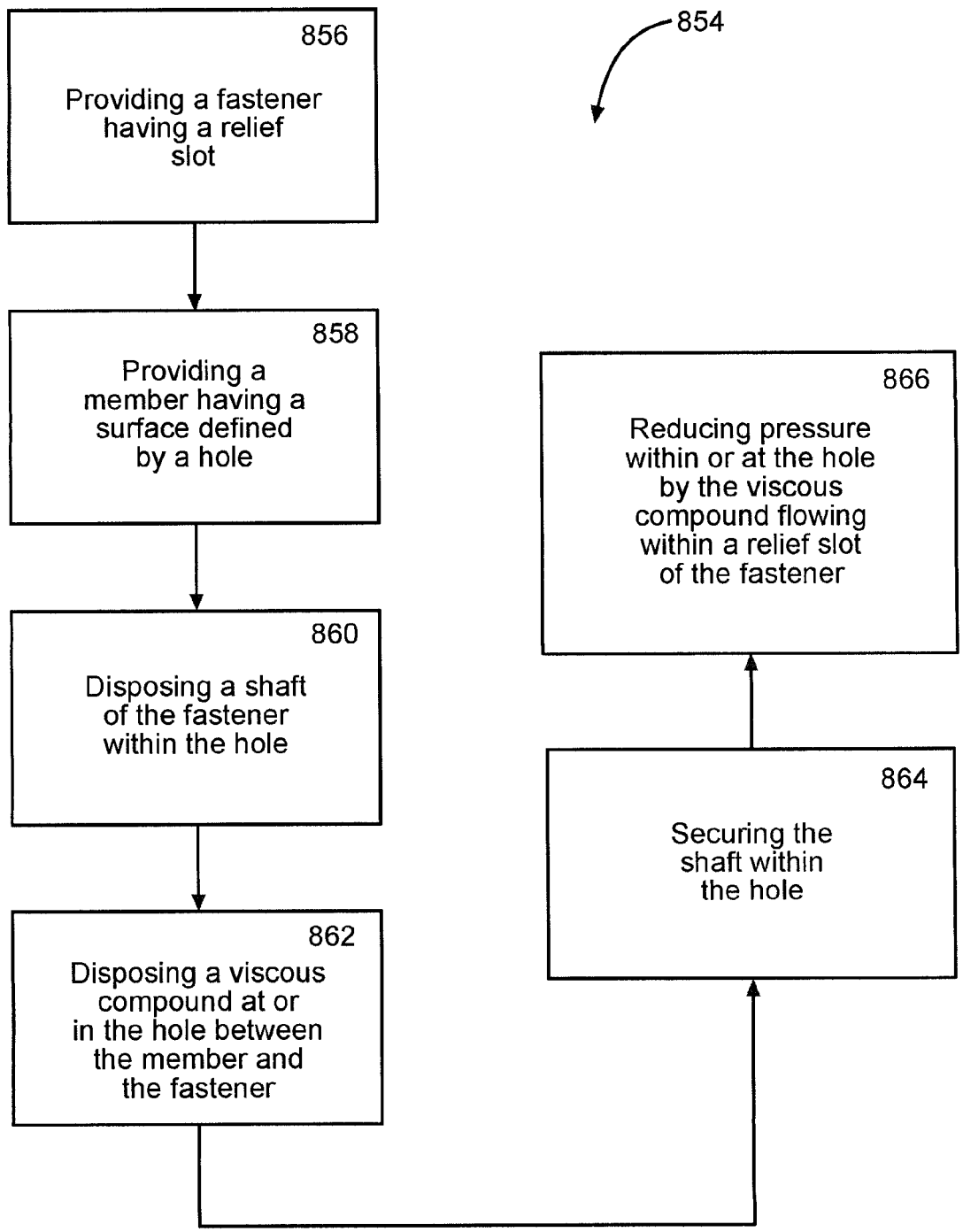
FIG. 12 is a flowchart showing one embodiment of a method of reducing pressure during installation of a fastener to a member using a viscous compound.

FIG. 12 is a flowchart showing one embodiment of a method 854 of reducing pressure during installation of a fastener 128, 228, 328, 428, or 528 to a member 18 using a viscous compound 22. In step 856, a fastener 128, 228, 328, 428, or 528 may be provided. The fastener 128, 228, 328, 428, or 528 may comprise any of the embodiments disclosed herein. In other embodiments, the fastener may vary. In step 858, a member 18 having a surface 19 defined by a hole 20 may be provided. The member 18 may comprise a composite material. In other embodiments, the member 18 may vary. Another member 25 may also be provided. In step 860, a shaft 130, 230, 330, 430, or 530 of the fastener 128, 228, 328, 428, or 528 may be disposed within the hole 20 of the member 18 so that a second surface 142 or 542 is disposed at least one of against the member surface 19 and within the hole 20.

In step 862, a viscous compound 22 may be disposed at and/or in the hole 20 between the member 18 and the fastener 128, 228, 328, 428, or 528. The viscous compound 22 may comprise at least one of sealant, paint, primer, adhesive, resin, grease, corrosion inhibiting compounds. In other embodiments, the viscous compound 22 may vary. In step 864, the shaft 130, 230, 330, 430, or 530 may be secured tightly within the hole 20. Step 864 may comprise rotating a nut 21 or 721 onto the second opposing end 136 or 536 of the shaft 130, 230, 330, 430, or 530 to secure the fastener 128, 228, 328, 428, or 528 between members 18 and 25 using a tool (not shown) engaged with an anti-rotation member 23. In other embodiments nut 21 or 721, opposing end 136 or 536, and/or anti-rotation member 23 may vary. In still other embodiments an anti-rotation member 23 may not be present and/or alternate methods of securing the fastener may be employed. In step 866, pressure may be reduced within the hole 20 by the viscous compound 22 flowing within a relief slot 148, 248, 348, 448, or 548 from at least one of near and at the first surface 138 or 538, to the second surface 142 or 542, and out of the hole 20. The method 854 may substantially reduce and/or eliminate irregularities from appearing in the member 18 during the installation process. The method 854 may also prevent the anti-rotation member 23 and the tool (not shown) used to install it from breaking, being stripped, and/or otherwise being damaged during the installation process.

One or more embodiments of the disclosure may reduce and/or eliminate hydraulic pressure during wet installation of the fasteners to a member. This may reduce and/or eliminate irregularities in the member, may reduce stress on the fastener anti-rotation member and/or tooling, may reduce the likelihood of damage to fastener, installation keys and/or tooling, may decrease installation cost due to the lack of a need for special installation tooling and/or by requiring less maintenance of the fasteners, member, and/or tooling, and/or may reduce one or more other types of problems of one or more conventional fasteners and/or methods of installation.

It should be understood, of course, that the foregoing relates to exemplary embodiments of the disclosure and that modifications may be made without departing from the spirit and scope of the disclosure as set forth in the following claims.

We claim:

1. A method of reducing pressure during wet installation of a fastener to a member using a viscous fluid comprising:
    providing a fastener comprising a shaft having first and second opposing ends and a first surface having a first diameter, and a head attached to the first opposing end of the shaft, the head having a second surface comprising a second diameter which is larger than the first diameter, the head having a third surface extending between the second surface and the first surface, the third surface comprising a relief slot extending from the second surface towards the first surface;
    disposing the shaft of the fastener within a hole of a member;
    disposing a viscous fluid between the member and the fastener during a wet installation; and
    reducing pressure within the hole during the wet installation by the viscous fluid flowing within the relief slot.

2. The method of claim 1 wherein the member is a composite material.

3. The method of claim 1 wherein the viscous fluid comprises at least one of sealant, paint, primer, adhesive, resin, grease, or a corrosion inhibitor.

4. The method of claim 1 further comprising rotating a nut onto the second opposing end of the shaft to secure the fastener to the member during the wet installation.

5. The method of claim 1 further comprising substantially reducing or eliminating irregularities from appearing in the member as a result of the reduction in pressure within the hole during the wet installation due to the viscous fluid flowing within the relief slot.

6. The method of claim 1 wherein the fastener is a countersunk fastener, the second surface is substantially perpendicular to a plane extending axially along the shaft, and the third surface is conically-shaped and non-parallel to both the second surface and to the first surface.

7. The method of claim 1 wherein the fastener is a protruding head fastener, the head further comprises a fourth surface which is substantially perpendicular to the second surface, and the second surface is substantially perpendicular to the third surface.

8. The method of claim 1 wherein the relief slot comprises at least one of a helical shape extending around the third surface, a plurality of slots extending substantially parallel to a plane extending axially along the shaft, a plurality of slots extending non-parallel to a plane extending axially along the shaft, or at least one of an oscillating arc or a sine wave shape extending around the third surface.

9. The method of claim 8 wherein the relief slot comprises the helical shape extending around the third surface.

10. The method of claim 8 wherein the relief slot comprises the plurality of slots extending substantially parallel to the plane extending axially along the shaft.

11. The method of claim 8 wherein the relief slot comprises the plurality of slots extending non-parallel to the plane extending axially along the shaft.

12. The method of claim 8 wherein the relief slot comprises the oscillating arc.

13. The method of claim 8 wherein the relief slot comprises the sine wave shape extending around the third surface.

14. The method of claim 1 further comprising preventing a fastener anti-rotation member from at least one of being stripped, being broken, or being damaged as a result of the reduction in pressure within the hole during the wet installation due to the viscous fluid flowing within the relief slot.

15. The method of claim 1 wherein the relief slot extends into the third surface.

16. The method of claim 1 wherein the relief slot extends from the second surface to the first surface.

17. The method of claim 1 wherein the relief slot extends from the second surface to near the first surface.

18. The method of claim 1 wherein the disposing the shaft of the fastener within the hole of the member further comprises disposing the second surface at least one of against a surface of the member, near the surface of the member, or within the hole.

19. The method of claim 1 wherein the disposing the viscous fluid between the member and the fastener during the wet installation further comprises disposing the viscous fluid at least one of at, near, or in the hole between the member and the fastener during the wet installation.

20. The method of claim 1 wherein the reducing the pressure within the hole during the wet installation by the viscous fluid flowing within the relief slot further comprises the viscous fluid flowing within the relief slot from at least one of near or at the first surface, to the second surface, and at least one of beyond the second surface or out of the hole.

* * * * *

UNITED STATES PATENT AND TRADEMARK OFFICE
CERTIFICATE OF CORRECTION

PATENT NO. : 8,146,230 B2  
APPLICATION NO. : 12/364366  
DATED : April 3, 2012  
INVENTOR(S) : John A. Davies, Jeffrey A. Wilkerson and John R. Porter Page 1 of 1

It is certified that error appears in the above-identified patent and that said Letters Patent is hereby corrected as shown below:

On the front page of the patent, Item (54) and at Column 1, lines 1 and 2, the title of the Patent should be corrected as follows:

Method of Reducing Pressure During Installation of A Fastener

Signed and Sealed this  
Fifteenth Day of May, 2012

David J. Kappos  
*Director of the United States Patent and Trademark Office*